June 27, 1944.　　T. W. ROSHOLT　　2,352,498
ROAD SPRAYING APPARATUS
Filed Jan. 2, 1941　　2 Sheets-Sheet 1
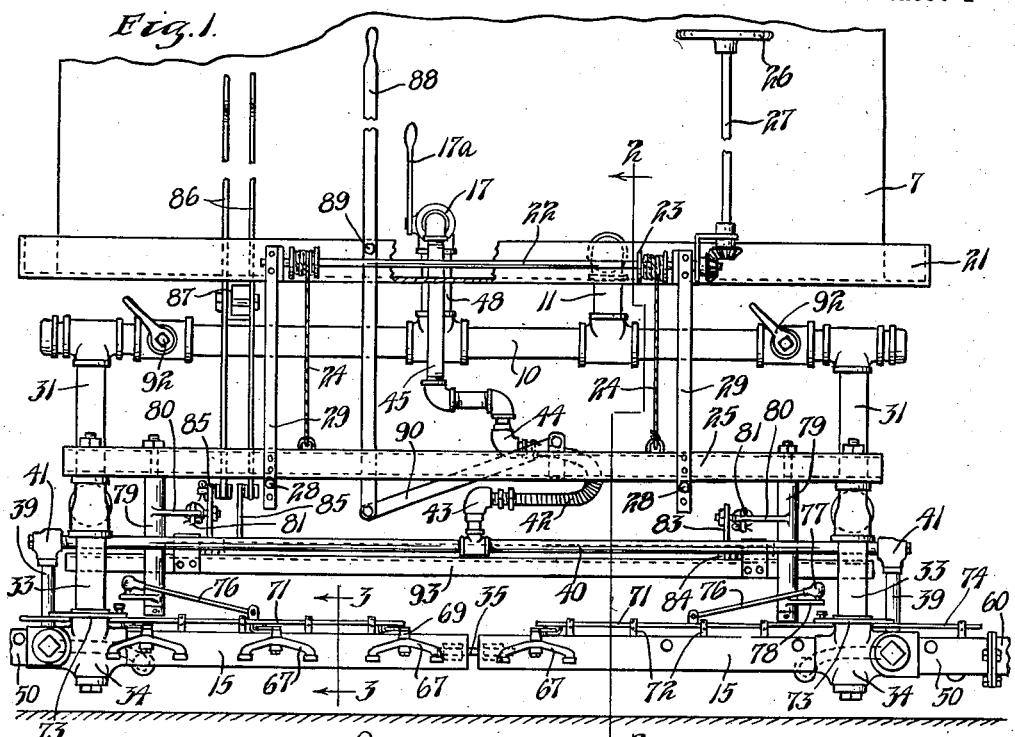
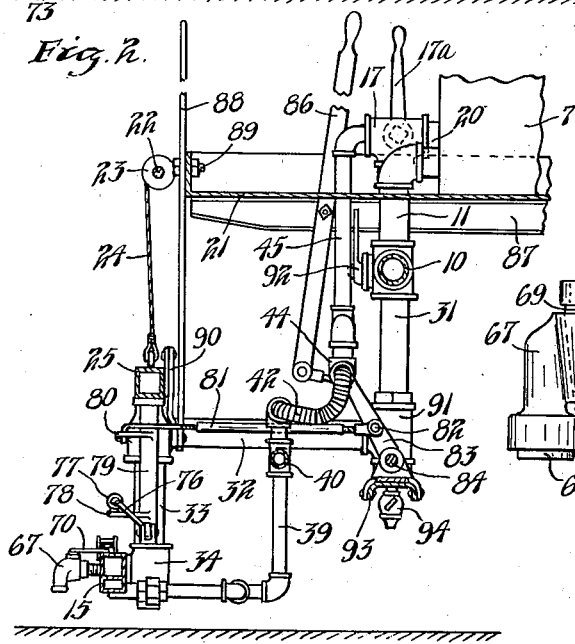
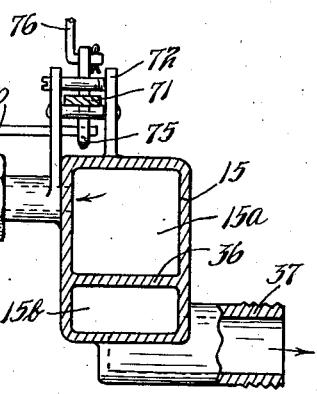
INVENTOR.
THORMAN W. ROSHOLT.
BY HIS ATTORNEYS.
Williamson & Williamson June 27, 1944.  T. W. ROSHOLT  2,352,498
ROAD SPRAYING APPARATUS
Filed Jan. 2, 1941  2 Sheets-Sheet 2
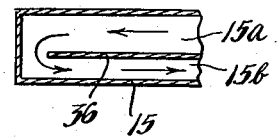
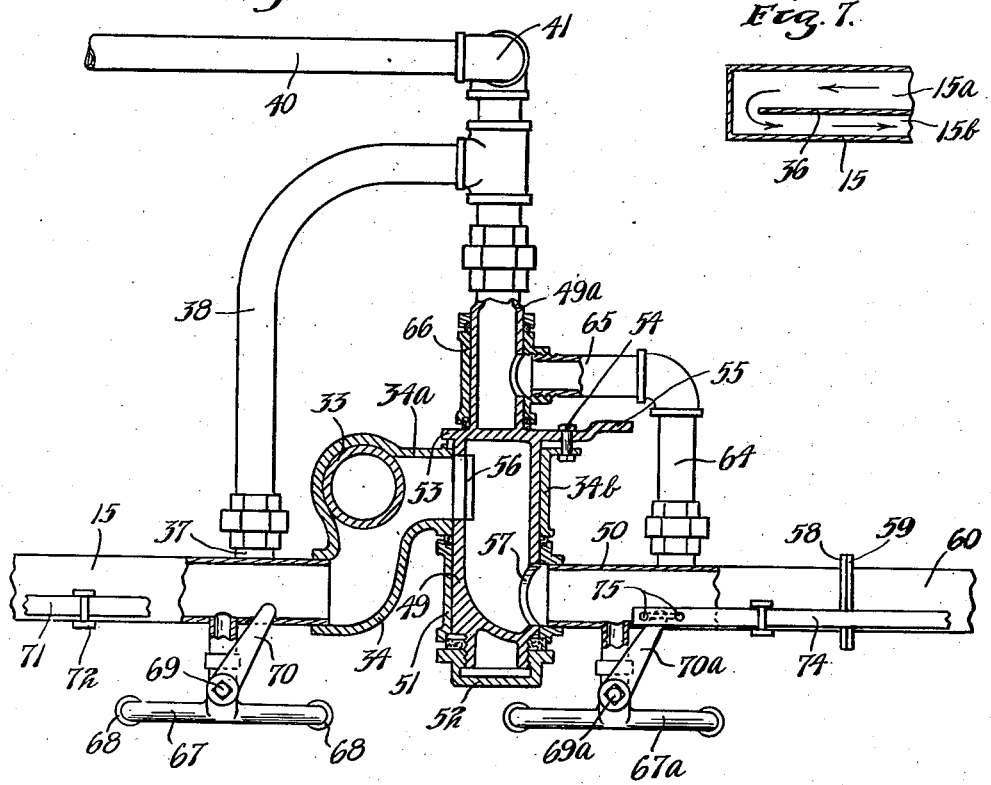
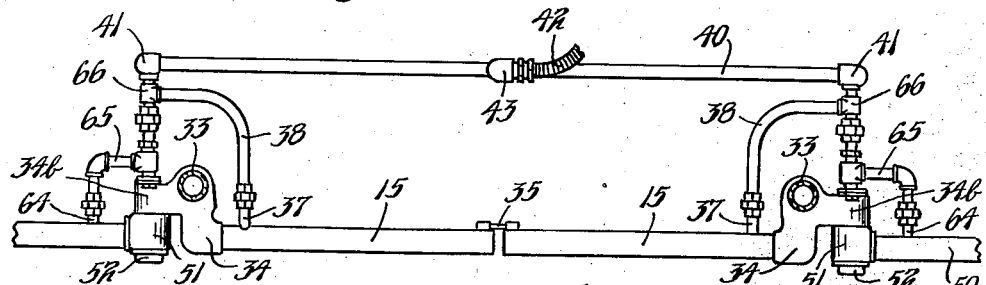
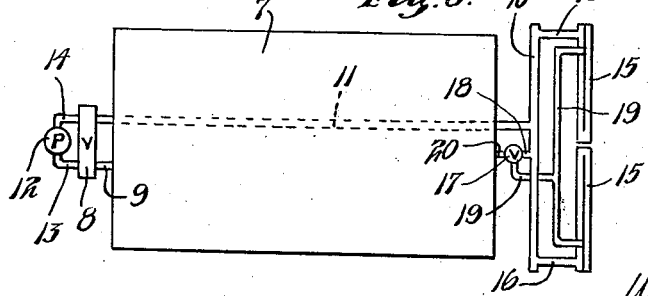
INVENTOR.
THORMAN W. ROSHOLT.
BY HIS ATTORNEYS.
Williamson & Williamson Patented June 27, 1944

2,352,498

UNITED STATES PATENT OFFICE 2,352,498

ROAD SPRAYING APPARATUS

Thorman W. Rosholt, Minneapolis, Minn., assignor to Rosco Manufacturing Company, Minneapolis, Minn., a corporation of Minnesota Application January 2, 1941, Serial No. 372,879

2 Claims. (Cl. 299—34)

This invention relates to liquid distributing apparatus and more particularly to apparatus for distributing road surfacing material over the bed of a roadway.

It is an object of my invention to provide liquid distributing apparatus and improved circulating means to maintain the system in condition for proper flow of liquid therethrough and also to maintain the liquid in a properly heated and freely flowing condition.

A further object of the invention is to provide a circulating spray bar having pivotally connected radial extensions wherein means is provided for simply and effectively maintaining the flow system through the pivotal joint between the main spray bar and its extension.

These and other objects and advantages of the invention will more fully appear from the following description made in connection with the accompanying drawings, wherein like reference characters refer to the same parts throughout the views, and, in which:

Fig. 1 is a rear elevation of spraying apparatus constructed in accordance with my invention;

Fig. 2 is a section taken approximately on line 2—2 of Fig. 1;

Fig. 3 is an enlarged section taken approximately on line 3—3 of Fig. 1;

Fig. 4 is a plan view of my spray bar sections with the valved outlets removed and showing portions of lateral spray bar extensions and flow connection therewith;

Fig. 5 is an enlarged fragmentary view partially broken away of the pivotal flow connection between one of the main spray bar sections and an extension thereof;

Fig. 6 is a more or less diagrammatic view of a flow system illustrating an application of the invention;

Fig. 7 is a fragmentary section through the inner end of a main spray bar section; and Fig. 8 is a fragmentary section through the end of a spray bar extension.

In the diagram in Fig. 6 there is indicated a tank 7 which comprises the source of road oil or similar liquid which is adapted to be mounted upon a truck chassis. A flow control valve 8 is connected to the tank by means of a pipe 9 and to a header 10 through the medium of a pipe 11 which can extend through or beneath the tank 7. A pump 12 is connected to the valve 8 by pipes 13 and 14. The valve 8 may be similar to the valve shown in the present pending application of Harold A. Cederstrom, Serial Number 223,642, filed August 8, 1938, Patent Number 2,272,544. It is not thought necessary to go into details of this valve except to call attention to the fact that it is adjustable to reverse the flow in the pipe 11 and preferably includes pressure relief means for bypassing some of the liquid from the pump in the event the supply is greater than the amount of liquid issuing from the spray bar 15. The liquid is conducted to the spray bar from the header 10 through conduits 16. A three-way valve 17 is connected at 18 to the header 10 and also by a conduit 19 to the spray bar 15. The valve 17 also has a conduit 20 connected thereto and to the main supply tank 7.

In Figs. 1 and 2 there are shown portions of the supply tank 7. Extending rearwardly therefrom is a platform 21. On this platform is mounted a shaft 22 which has a pair of drums 23 mounted thereon. The drums have ropes or cables 24 wound around them, and these ropes extend downwardly to a cross member 25, and this cross member can be raised or lowered by rotation of a hand wheel 26 on a shaft 27 which is shown geared to the horizontally disposed drum shaft 22. The cross member 25 can also be held against downward movement by means of pins 28 which can be inserted through suitable apertures in hanger members 29, the latter being supported from the platform 21.

The main supply pipe 11 communicates with the transverse header 10 which is suspended below platform 21. In Figs. 1 and 2 the header 10 is connected at its ends with vertical conduits 31 and these in turn have horizontal conduits 32 extending rearwardly therefrom. Conduits 32 connect with vertical pipes 33 and said pipes 33 extend downwardly to connect with castings 34. Conduits 31, 32 and 33 correspond to the conduits 16 in the diagram in Fig. 6. The main spray bar sections 15 connect with sump castings 34 and extend toward each other and their adjacent ends are connected by a safety break link 35 such as is shown in the above identified application for patent and in Fig. 1.

Each of the spray bar sections 15 is provided with a longitudinal horizontal partition 36, as shown in Fig. 3. The partition 36 terminates in spaced relation to the inner ends of the spray bar sections 15 to permit a flow circulation from the upper chamber 15a to the lower chamber 15b. The upper chamber 15a is in flow communication with the casting 34 and vertical pipe 33.

The lower spray bar chambers 15b each have a return connection 37 (Figs. 3 and 4) which is connected by means of a pipe 38 to a vertical conduit 39 at each end of a horizontally disposed conduit 40 (Fig. 4). Connections 41 between the pipe 40 and the vertical pipes 39 permit the vertical pipes to rotate relative to the horizontal pipe 40. At the center of the pipe 40 there is a flexible conduit 42 connected thereto by means of a swivel connection 43 (Fig. 2). The other end of the conduit 42 has a swivel connection 44 which is in turn connected with a line 45 which leads upwardly to the three-way valve 17 controlled by a suitable operating lever 17a. The valve 17 is connected to the header 10 by means of a vertical pipe 48 and is also connected to the tank 7 by means of the pipe 20.

The sump casting 34 shown in section in Fig. 5 was previously described as being connected to a main spray bar section 15. This casting has an extension 34a including a sleeve-like portion 34b which rotatably receives a cylindrical member 49 which extends outwardly from the sleeve portion 34b and has a spray bar extension member 50 connected thereto. The cylindrical member 49 slips into the sleeve 34b from above as viewed in Fig. 5 and a sleeve 51 fits over the extended cylindrical member 49 and a cap nut 52 is threaded upon the end of the member 49, said cap nut bearing against packing and also against the sleeve 51 to pull the cylindrical member downwardly as viewed in Fig. 5 so that a flange 53 on the other end of the extended cylindrical member 49 will be pulled tight against packing shown positioned between said flange, the casting extension 34a and the casting sleeve portion 34b. The cylindrical member 49 is not directly connected to the spray bar extension 50, the latter being supported by the sleeve 51 thus permitting the extension to be swung upwardly or downwardly and rotated relative to the cylindrical member 49, or said cylindrical member can be made to rotate relative to the sleeve 34b by disconnecting a nutted bolt 54 and swinging the lever 55 which is integral with the end flange 53 on said cylindrical member 49. Thus the road spraying liquid can be circulated in the extensions 50, or said extensions can be cut off when circulation in the spray bar extensions is not desired. The member 49 has a cut-out 56 to afford flow communication with the casting 34 and it has another cut-out 57 to permit flow to the spray bar extension 50.

The spray bar extension 50 has a flanged open end 58 which is adapted to be bolted to a flanged end 59 of a second spray bar extension member 60. These spray bar extension members are provided with longitudinally extending horizontal partitions 61, as best shown in Fig. 8, and a suitable end cap 62 can be placed over the outer end of the respective extension member to close the same. It will be seen that the cap is so arranged that it will permit flow around the outer end of the outermost partition in one of the extension members 60. The lower chamber 63 of the spray bar extension member 50 is connected by pipes 64 and 65 to a sleeve-like member 66 which is rotatably mounted upon an extension 49a on the cylindrical member 49. The extension 49a affords communication with ends connected to the pipes 39 and 40 to which the main spray bar return pipes 38 are also connected. It should be noted that the pivotal connections involved in each pivoted spray bar extension, namely, the main extension pivot sleeve 49, the sleeve 51, and the return flow connection sleeve 66 are on a common longitudinal axis or rotational center.

When the spray bar extensions are tilted upwardly sleeve 51 will rotate about the cylindrical member 49 and sleeve 66 will rotate about the extension 49a on said cylindrical member 49. Thus the spray bar extension or extensions can be made to maintain flow communication with the system when said extensions are lowered or turned upwardly.

The main spray bar sections 15 are provided with double spray units 67 which are generally of T shape and a pair of spray nozzles 68 are provided at the ends of the T. A single valve member 69 is provided for each of these double spray units and each of said valves 69 is provided with an operating lever 70 which extends over the spray bar section 15. The upper side of each of the main spray bar sections is provided with a valve control lever 71 running through suitable guides 72. The operating levers 71 are connected by means of a detachable link 73 with spray bar extension valve operating levers 74. Each of the spray bar extension members is provided with suitably spaced spray outlets 67a and valves 69a and valve levers 70a. The extension valve operator 74 is shown provided with a pair of vertical pins 75 and the valve lever 70a is positioned between said pins 75 so that when the operating lever 74 is shifted longitudinally the valve lever 70a and valves 69a will be operated. This connection is also duplicated on the main spray bar section with their valve operator 71 and valve lever 70 although this detail is not shown on the main spray bar sections in Fig. 5.

The main spray bar valve operators 71 have links 76 pivotally connected thereto and each of the links 76 has a ball joint connection 77 with a lever 78 which extends outwardly from a vertically positioned rotatable post 79. The post 79 has a radially extending lever 80 connected thereto and said lever 80 is pivotally connected to a link 81, as best shown in Fig. 2, said link 81 having a ball joint connection 82 with a lever 83. The lever 83 is mounted for movement with a shaft 84 which extends across the spray bar assembly and said shaft 84 has a lever 85 connected thereto and said lever 85 is in turn pivotally connected to an elongated hand lever 86 which extends upwardly through the platform 21 and is pivotally mounted on a channel member 87 which is adapted to be relatively stationarily supported by the truck frame.

The left-hand main spray bar section 15 has a valve operator 71, a link 76, a post 79, said post having an outwardly extending lever 80 connected by a link 81 to a lever 85, said lever being in turn connected to a hand lever 86 corresponding to the previously described lever and linkage mechanism at the right of the apparatus.

The transverse bar 25 with the spray bar assembly is capable of being shifted laterally by means of a hand lever 88 pivotally connected to the platform 21 on a pivot pin 89 and a second lever 90 which is connected between the lower end of the lever 88 and the bar 25. This shifting of the spray bar is made possible by the provision of a sleeve 91 which forms part of the connection between each of the horizontal spray bar feeder pipes and each of the vertical feeder pipes 31 as well as the pivotal connections 41 between the vertical return pipes 39 and their common horizontal return connector 40 and the flexible conduit portion 42 in the return line.

The header 10 is provided with a pair of cut off valves 92 adjacent its ends to prevent circulation from the header down the vertical feed pipes 31 to the spray bar as will be brought out below.

The arm 93 which extends across the assembly and supports the valve operating shaft 84, best shown in Fig. 2, also connects the vertical supply pipes 31 adjacent their lower ends and beneath each of said pipes is a drain cock 94 which can be used to drain the bottom ends of said pipes 31 where they lie in the sleeves 91.

When the apparatus is set up and a supply of oil or similar liquid is placed in the tank 7 and heated by suitable means well known in the art the pump 12 is started and the valve 8 set so that there will be flow from the tank through the pipe 11 to the header 10. The hand valves 92 at the ends of the header are set in an open position. Liquid will thereupon flow down the vertical feed pipes 31 through the horizontal feed pipes 32 and down the lower vertical feed pipe 33 to each of the sump castings 34. The flow from the sump casting 34 is in two directions, a portion of the stream entering the upper portion of each of the main spray bar sections 15 and the rest of the stream entering the upper portion of each of the extension members 50 and additional extensions 60 if the latter are in place. When the three-way valve 17 is set to permit flow from the header down through the flexible conduit there will be liquid supplied through that conduit to the spray bar as well. The spray bar nozzles can be opened throughout the entire discharge apparatus if desired or various sections of the spray bar can be used while others are cut off. It is possible to open or close the outlet valves in either right or left spray bar main sections and their extensions or the main spray bar section alone can be used for spraying. The link 73 in Fig. 1 which connects the valve operators on the main spray bar sections and the extensions can be disconnected so that the main bar valves can be independently operated.

By reason of the means of engagement of the valve operator bars 71 and 74 on the main bars and their extensions it is possible to shift the operator members 71 or 74 to the full limit of movement in one direction and then manually swing one of the valve arms 70 or 70a out of engagement with the operator member. Then the operator can be shifted to open or close the remainder of the valves in the main spray bar or its extensions without effecting their operation or that of the valve which has been manually disengaged. This disengagement feature clearly contributes to the flexibility of the apparatus.

When no spraying is being done it is possible to keep liquid circulating throughout the entire system so that it will remain open and heat will be conveyed to various portions of the flow system as well as the outlet nozzles and their cut out valves. As stated before, the supply entering the sump casting 34 and then branching to the main spray bar sections and their extensions pasess along the upper portion of the main bar portion and extensions and returns through the lower portions of said conduits. The return from the main spray section is effected through the pipe 38 and flexible conduit 42 through the three-way valve 17 and thence directly to the tank 7.

At times it might be desirable to circulate from the tank through the pump and valve 8. The manually operated header valves 92 are then closed and the three-way valve 17 manipulated to permit flow from the header 10 through the three-way valve and thence to the tank. This permits circulation of liquid from the tank and return without going through the entire spray bar system.

After a spraying operation has been completed liquid can be removed from the spray bar by operation of the reversing valve 8 which causes the liquid to be sucked from the spray bar through its supply lines and thence from the header through the pipe 11 which extends the full length of the tank and from said pipe through the valve to the tank. In this reverse suction operation the three-way valve is set to permit flow upwardly through the spray bar and flexible conduit and to the header 10 but communication is cut off between the three-way valve 17 and its direct tank connection.

A position permitting full circulation through the entire apparatus was mentioned above. With this same flow arrangement it is, of course, possible to open the spray bar outlet valves to permit spraying and also provide an excess return directly to the tank through the flexible conduit 42 and the three-way valve 17.

Fig. 4 illustrates generally the relationship between the main spray bar sections and extensions and the pivotal connection of said extensions and the flow connections between the main spray bar sections and extensions and the line which includes the flexible conduit 42. It sometimes happens that an extended spray bar section will strike an obstacle such as a culvert and when such an event happens the frangible link 45 will shear off and permit sections of the spray bar to swing on their vertical pivots. As they swing the horizontal pipe 40 which extends across and back of the main spray bar sections will, of course, have to swing with the entire unit. Because of the pivotal connections 41 at the ends of the pipe 40 this movement can take place without injury to the apparatus. The flexible conduit 42 is, of course, provided to permit such movement.

It will, of course, be understood that various changes may be made in the form, details, arrangement and proportions of the various parts without departing from the scope of my invention.

What is claimed is:

1. In a liquid distributing device, a tank, a supply conduit connected to said tank, means for producing a flow of liquid from said tank through said supply conduit, a sectional spray bar unit connected to said supply conduit, the sections of said spray bar unit each having partitions therein extending to the extreme ends of said sections to divide them into inlet and outlet flow chambers and the partitions of said sections being in substantial abutment, and an end cap detachably connected to the outer end of the outermost section and also securable to the ends of each of said sections when outer sections are removed, said end cap having at least a portion thereof spaced outwardly from the end of the partition in the section to which it is secured to permit flow communication between the inlet and outlet chambers of said sections.

2. In a liquid distributing device, a tank, a supply conduit connected to said tank, means for producing a flow of liquid from said tank to said supply conduit, a relatively stationary spray bar section having a partition thereof dividing the same into an inlet chamber and an outlet chamber, said chambers communicating at an end of said spray bar section, said supply conduit being connected to said inlet chamber at the end of said spray bar section opposite to the point of communication between said chambers, a spray bar extension having a partition therein dividing it into an inlet chamber and an outlet chamber, a pivotal connection between said stationary spray bar section and said extension permitting said extension to swing relative to said stationary spray bar section, means at the outer end of said extension affording flow communication between the inlet and outlet chambers of said extension, said pivotal connection having conduits communicating with said stationary spray bar section and said extension to provide flow communication between the inlet chambers of said stationary section and said extension, a return conduit communicating with said tank, and conduits connecting said outlet chambers of said stationary section and said extension with said return conduit.

THORMAN W. ROSHOLT.